US006778678B1

(12) United States Patent
Podilchuk et al.

(10) Patent No.: US 6,778,678 B1
(45) Date of Patent: Aug. 17, 2004

(54) HIGH-CAPACITY DIGITAL IMAGE WATERMARKING BASED ON WAVEFORM MODULATION OF IMAGE COMPONENTS

(75) Inventors: Christine Irene Podilchuk, Bridgewater, NJ (US); Sergio Daniel Servetto, Urbana, IL (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/368,381

(22) Filed: Aug. 4, 1999

Related U.S. Application Data

(60) Provisional application No. 60/102,782, filed on Oct. 2, 1998.

(51) Int. Cl.[7] .............................................. G06K 9/00
(52) U.S. Cl. .................................................... 382/100
(58) Field of Search ............................... 382/100, 232; 380/51, 287; 713/176, 179, 180; 348/460; 358/3.28

(56) References Cited

U.S. PATENT DOCUMENTS

| | | | | |
|---|---|---|---|---|
| 4,807,031 A | * | 2/1989 | Broughton et al. | 348/460 |
| 5,663,766 A | * | 9/1997 | Sizer, II | 348/473 |
| 5,809,139 A | * | 9/1998 | Girod et al. | 380/202 |
| 5,915,027 A | * | 6/1999 | Cox et al. | 380/54 |
| 6,263,087 B1 | * | 7/2001 | Miller | 382/100 |
| 6,278,792 B1 | * | 8/2001 | Cox et al. | 382/100 |
| 6,332,030 B1 | * | 12/2001 | Manjunath et al. | 382/100 |

OTHER PUBLICATIONS

I. Cox, J. Killian, T. Leighton, and T. Shamoon, "Secure Spread Spectrum Watermarking for Multimedia," Technical Report 95–10, NEC Research Institute, pp. 1–33, 1995.
A. Watson, G. Yang, J. Solomon, and J. Villasenor, "Visibility of Wavelet Quantization Noise," IEEE Transactions on Image Processing, 6(8), pp. 1164–1175, pp. 1–33, Aug. 1997.
C. Podilchuk and W. Zeng, "Image Adaptive Watermarking Using Visual Models," IEEE Journal on Selected Areas in Communications, 16(4), pp. 1–37, May 1998.
J. O. Ruanaidh, W. Dowling, and F. Boland, "Watermarking Digital Images for Copyright Protection," IEEE Proceedings on Vision, Image and Signal Processing, 143(4), pp. 250–256, Aug. 1996.
J. Smith and B. Comiskey, "Modulation and Information Hiding in Images," Lecture Notes in Computer Science (1174), Springer–Verlag, 11 pages, Aug. 1996.
Andrew B. Watson, "DCT Quantization Matrices Visually Optimized for Individual Images," Human Vision, Visual Processing, and Digital Display IV, Bernice E. Rogawitz, Editor, Proc. SPIE 1913–14, pp. 1–15, 1993.

* cited by examiner

*Primary Examiner*—Andrew W. Johns
*Assistant Examiner*—Shervin Nakhjavan

(57) ABSTRACT

Digital watermark information is inserted into an image by first separating the image into components, e.g., discrete cosine transform (DCT) blocks or image subbands, and then associating one or more bits of the digital watermark information with each of the components. For example, a single bit may be associated with each of the components by modulating the components with selected waveforms representative of the corresponding digital watermark information bits. As another example, the digital watermark information bits may be coded, e.g., using a repetition code, linear block code or convolutional code, to form channel bits, such that the modulating waveforms are selected for the image components based on the corresponding channel bits. The digital watermark information may include a total of B bits of information for representing a particular watermark, such that $M=2^B$ distinct watermarks can be generated using the B information bits. The invention also provides techniques for determining an upper bound on the number of distinct watermarks that can be reliably detected in a given embodiment, as a function of the noise variance of a potential jammer.

22 Claims, 3 Drawing Sheets

HIGH-CAPACITY DIGITAL IMAGE WATERMARKING BASED ON WAVEFORM MODULATION OF IMAGE COMPONENTS

RELATED APPLICATION

The present application claims the benefit of U.S. Provisional Application No. 60/102,782, filed Oct. 2, 1998 and entitled "Capacity Issues in Digital Image Watermarking."

FIELD OF THE INVENTION

The present invention relates generally to image processing techniques, and more particularly to techniques for processing images to incorporate digital watermarking information.

BACKGROUND OF THE INVENTION

Digital watermarking techniques are used to protect electronic data from unauthorized copying or distribution. Unlike a traditional visible watermark used on paper, a digital image watermark is generally designed so as not to alter the perceived quality of the electronic content, while also being robust to attacks. For example, in the case of image data, typical signal processing operations, such as linear and nonlinear filtering, cropping, rescaling, noise removal, lossy compression, etc., should ideally be configured such that if any of these operations result in alteration or suppression of the inserted watermark, then the resulting image must be so severely degraded to render it worthless. However, it is equally important that the digital watermark not alter the perceived visual quality of the image. It is therefore clear that from a signal processing viewpoint, the two basic requirements for an effective watermarking technique, i.e., robustness and transparency, conflict with each other.

Digital watermarking applications can generally be grouped into two main categories: source-based applications and destination-based applications. Digital watermarks in source-based applications are typically used for purposes of ownership identification and tamper detection. A unique watermark signal is hidden in all copies of a particular image, prior to their distribution. Examination of the particular watermark signal hidden in a given image can then be used to determine the originator of the image, and whether parts of the image have been tampered with, e.g., if the picture in a photo identification has had the face replaced, etc. Furthermore, digital watermarks can be used to embed application-dependent information, not necessarily dealing with security issues, that can be maintained even when the image is transferred across different media such as disk, D1 tape, high-quality printouts, etc.

Digital watermarks in destination-based applications are typically used for tracing purposes. In such applications, a distinct watermark signal that uniquely identifies a particular copy of the image is hidden in that copy, prior to its distribution, and acts as a "serial number" for the image. Then, in the event that multiple unauthorized copies of a given image are detected, retrieval of that serial number from one of the copies of the image can identify the particular user whose image was utilized to create the unauthorized copies.

It is known that spread-spectrum communication techniques, as described in, e.g., R. Blahut, "Digital Transmission of Information," Addison Wesley Publishing Company, 1990, can also be applied to increase the robustness of digital watermarks. In spread-spectrum communication systems, an information-bearing narrowband signal is converted into a wideband signal prior to transmission, by modulating the information waveform with a wideband noise-like waveform that is unknown to a jammer. As a result of this bandwidth expansion, within any narrow spectral band, the total amount of energy from the information signal is small. However, by appropriately combining all these weak narrowband signals at the demodulator, the original information signal is recovered. Hence a jammer, unaware of the shape of the wideband carrier, is forced to spread its available power over a much larger bandwidth, thus reducing its effectiveness.

The application of the above-described spread-spectrum communication techniques to digital watermarking is described in, e.g., I. Cox, J. Killian, T. Leighton, and T. Shamoon, "Secure Spread Spectrum Watermarking for Multimedia," Technical Report 95-10, NEC Research Institute, 1995. In this approach, robustness and transparency are ensured by introducing many small changes into the most perceptually-significant image components. Since during the watermark extraction process the location and value of these changes are known, it is possible to concentrate the information of all the small changes to come up with a robust decision on the presence or absence of a particular digital watermark. Furthermore, in order to destroy such a watermark, a substantial amount of noise would be required in all the perceptually-significant components, thereby drastically reducing the perceived image quality.

These and other conventional digital watermarking techniques may make use of models of the human visual system. Recently, visual models have been developed specifically for the performance evaluation of lossy image compression algorithms, e.g., A. Watson, G. Yang, J. Solomon, and J. Villasenor, "Visibility of Wavelet Quantization Noise," IEEE Transactions on Image Processing, 6(8), pp.1164–1175, August 1997. One common paradigm for perceptual image coding is based on deriving an image dependent mask containing a set of just noticeable difference (JND) thresholds used to compute perceptually-based quantizers. These models, originally designed for perceptual coding applications, are also well suited for watermarking. For example, the JND thresholds can be used as upper bounds on watermark intensity levels. Hence, a criterion is available to address simultaneously the conflicting goals of robustness and transparency: a watermark can be made maximally strong, subject to an invisibility constraint determined from the JND thresholds. An effective watermarking technique based on these principles is described in C. Podilchuk and W. Zeng, "Image Adaptive Watermarking Using Visual Models," IEEE Journal on Selected Areas in Communications, 16(4), May 1998.

Other conventional digital image watermarking techniques are described in, e.g., J. O. Ruanaidh, W. Dowling, and F. Boland, "Watermarking Digital Images for Copyright Protection," IEEE Proceedings on Vision, Image and Signal Processing, 143(4), pp. 250–256, August 1996, and J. Smith and B. Comiskey, "Modulation and Information Hiding in Images," Lecture Notes in Computer Science (1174), Springer-Verlag, August 1996. A significant problem with these and other conventional techniques is that they fail to address adequately the issue of how many watermarks can be reliably encoded. For example, because the approach in the J. Smith and B. Comiskey reference fails to differentiate between image data and impairments introduced by a jammer, the number of different watermarks that can be reliably distinguished is significantly reduced.

SUMMARY OF THE INVENTION

In accordance with the invention, digital watermark information is inserted into an image by first separating the image into components, e.g., discrete cosine transform (DCT) blocks or image subbands, and then associating one or more bits of the digital watermark information with each of the components. In an illustrative embodiment of the invention, a single bit of digital watermark information is associated with each of the components by modulating the components with selected waveforms representative of the corresponding digital watermark information bits. For example, the selected waveforms may comprise a pair of n-bit vectors having a zero mean and an identity covariance matrix, with one of the vectors representing a binary one, and the other representing a binary zero. The digital watermark information may include a total of B bits of information for representing a particular watermark, such that $M=2^B$ distinct watermarks can be generated using the B information bits. A visual model may be used to determine a particular subset of the image components to be associated with one or more bits of the digital watermark information, so as to ensure that modification or deletion of the watermark information will render the resulting image unusable.

In another possible embodiment of the invention, the digital watermark information bits may be coded, e.g., using a repetition code, linear block code or convolutional code, to form channel bits, such that the modulating waveforms are then selected for the image components based on the corresponding channel bits. For example, B digital watermark information bits to be inserted in a given image may first be mapped to N channel bits using an (M, N) code, where $M=2^B$ is the number of distinct watermarks, and N is the block length of the code and the number of image components. A given one of the N channel bits is then associated with a corresponding one of the N image components by modulating that component with an appropriately-selected modulation waveform.

Advantageously, the invention provides practical techniques for inserting and detecting a large number of distinct watermarks, in a simple and cost-effective manner, and without the problems associated with the above-described conventional techniques. For example, an embodiment in which B=32 watermark information bits are stored in 8×8 pixel DCT blocks of a 512×512 pixel image can reliably distinguish on the order of $2^{32} \approx 4 \cdot 10^9$ distinct watermarks, which is sufficient for many high-capacity digital watermarking applications. Further increases in capacity can be achieved by increasing the number of watermark bits stored in the image components. The invention can also be used to determine an upper bound on the number of distinct watermarks that can be reliably detected in a given embodiment, as a function of jammer noise variance. These and other features and advantages of the present invention will become more apparent from the accompanying drawings and the following detailed description.

DETAILED DESCRIPTION OF THE INVENTION

Figure 1:
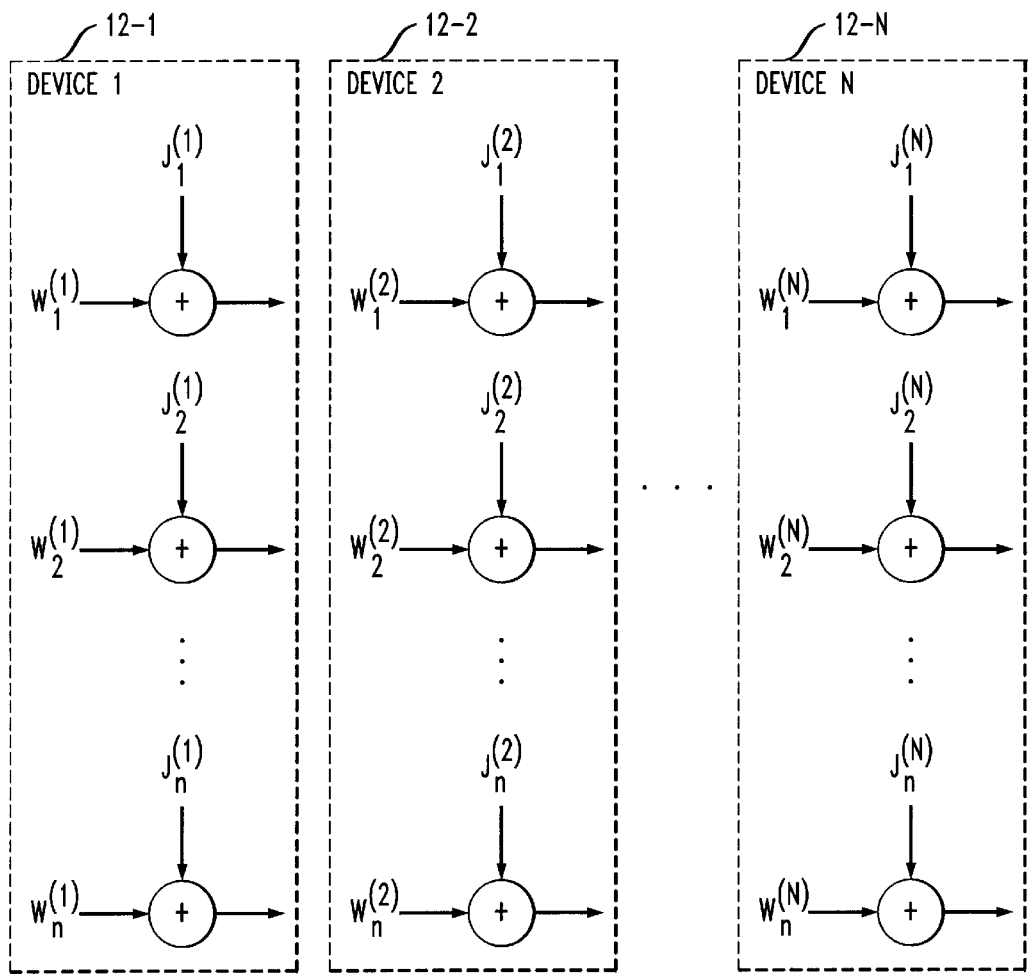
FIG. 1 illustrates the manner in which an image can be modeled as an array of storage devices in accordance with the techniques of the invention.

The present invention will be illustrated in the context of an exemplary destination-based digital image watermarking application, in which each watermark serves as a unique embedded identifier or "serial number" for the image in which it is embedded. It should be understood, however, that the techniques of the invention are more generally applicable to any digital watermarking application in which it is desirable to improve watermark reliability, including source-based digital image watermarking, and digital watermarking of video or other types of electronic data. The term "image" as used herein is therefore intended to include electronic data such as a video frame or set of frames.

In a destination-based digital image watermarking application, an attack that does not eliminate a given watermark completely is still successful if it changes the watermark to the point that a different identifier is recovered when the watermark is read. It is therefore important to determine the maximum number of different watermarks that can be distinguished reliably, and to provide suitable watermarking techniques to approximate that maximum. These objectives are achieved in an illustrative embodiment of the invention in which it is assumed that attacks on the watermarks can be modeled as additive noise. As will be described below in conjunction with FIGS. 1 and 2, it can be shown that the process of inserting a watermark may be analogized to that of storing bits in certain devices, such that the storage capacity of these devices provides an indication of the maximum number of watermarks that can be distinguished reliably. A simple encoder and decoder architecture for inserting watermarks so as to approximate the maximum will be described below in conjunction with FIGS. 3 and 4.

Techniques for modeling images as storage devices for watermarking purposes, and for computing the storage capacity of such devices, will now be described in greater detail. In C. Podilchuk and W. Zeng, "Image Adaptive Watermarking Using Visual Models," IEEE Journal on Selected Areas in Communications, 16(4), May 1998, a technique for inserting watermarks is described, in which an image is broken into N components $$C^{(k)}=[c_1^{(k)}, \ldots, c_n^{(k)}], k=1 \ldots N.$$

These components can be, e.g., blocks of DCT coefficients or sets of subband coefficients. For each component, define a vector $$P^{(k)}=[p_1^{(k)}, \ldots, p_n^{(k)}], k=1 \ldots N$$

of positive real numbers, where each $p_i^{(k)}$ denotes the maximum standard deviation of the noise that can be tolerated by $c_i^{(k)}$ yet still remains perceptually invisible. The vectors $P^{(k)}$ are computed based on models of the human visual system, which as previously mentioned have been developed in the context of perceptual coding. A watermark is inserted in an image by generating random vectors $$W^{(k)}=[w_1^{(k)}, \ldots, w_n^{(k)}], k=1 \ldots N$$

with a mean of zero and an identity covariance matrix I. The watermarked image is then defined to be an image having components $$M^{(k)}=[c_1^{(k)}+p_1^{(k)}w_1^{(k)}, \ldots, c_n^{(k)}+p_n^{(k)}w_n^{(k)}], k=1 \ldots N.$$

Given an arbitrary set of image components $\tilde{C}^{(k)}$, a watermark is retrieved simply by inverting the operations defining $M^{(k)}$:

$$\hat{W}^{(k)} = \left[\frac{\tilde{c}_1^{(k)} - c_1^{(k)}}{p_1^{(k)}}, \ldots, \frac{\tilde{c}_n^{(k)} - c_n^{(k)}}{p_n^{(k)}}\right], k = 1 \ldots N$$

In accordance with the invention, an image can be considered as representing an array of storage devices by viewing the $C^{(k)}$ image components as "boxes" in which the random vectors $W^{(k)}$ are stored.

Consider now the process of retrieving a watermark. In general, either due to intentional attacks or due to normal image processing operations, $W^{(k)} \neq \hat{W}^{(k)}$. The above-noted storage devices are therefore regarded as being "imperfect." In accordance with the invention, these imperfections can be modeled as additive noise. That is, $$\hat{W}^{(k)} = W^{(k)} + J^{(k)}, k = 1 \ldots N$$

where $J^{(k)} = [j_1^{(k)} \ldots j_n^{(k)}]$ is a zero mean random vector with covariance matrix $\sigma I$. It should be noted that this additive noise assumption, although utilized in the description of the illustrative embodiment, is not a requirement of the invention, and need not be applicable in a given embodiment of the invention.

Figure 2:
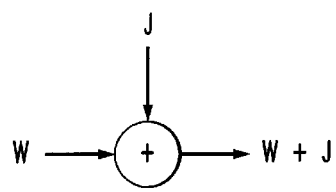
FIG. 2 shows a model of a discrete time channel with additive noise, which comprises an element of the array of FIG. 1.

FIG. 1 shows a diagram of the above-described storage device model, in which an image is characterized as an array 10 of N parallel storage devices 12-1, 12-2, ... 12-N, with each of the N storage devices representative of a corresponding one of the $C^{(k)}$ image components. Each of the storage devices 12-N is made up of n elements, with each of the n elements having a structure corresponding generally to a single-letter additive noise channel as shown in FIG. 2. A single-letter channel refers to a channel which receives a single information signal, in this case a digital image watermark information signal $w_i$.

The storage capacity of the array 10 of FIG. 1 will now be determined, in order to provide an indication as to the number of watermarks that can be reliably stored in such an array. For example, the capacity of the array 10 can be determined as a function of the noise variance $\sigma^2$ as follows. In the single-letter channel of FIG. 2, both watermark signal transmitter and watermark signal jammer are assumed to have zero mean, i.e., $E(W) = E(J) = 0$, with the transmitter power constrained by $E(W^2) = P_T$, and the jammer power constrained by $E(J^2) = P_J$. Furthermore, it is assumed that W and J are independent. Hence, the channel capacity is given by the mutual information expression I(W; W+J), and of course is a function of the distributions of W and J. This mutual information expression is described in greater detail in, e.g., T. Cover and J. Thomas, "Elements of Information Theory," John Wiley and Sons, 1991.

Given this setup, jamming may be defined as a game in which the watermark signal jammer player chooses a distribution on J to minimize I(W; W+J), while the watermark signal transmitter player chooses a distribution on W to maximize I(W; W+J). For a game so defined, and letting $W^* \sim N(0, P_T)$, and $J^* \sim N(0, P_J)$, where N (x, y) denotes a normal distribution with mean x and variance y, it is possible to show that $W^*$ and $J^*$ satisfy the following saddlepoint conditions $$I(W; W+J^*) \leq I(W^*; W^*+J^*) \leq I(W^*; W^*+J)$$

and therefore that $$\min_J \max_W I(W; W+J) = \max_W \min_J I(W; W+J) = \frac{1}{2}\log\left(1 + \frac{P_T}{P_J}\right).$$

The jamming game therefore has a value, i.e., the right-hand side of the above equation is the capacity of a power-constrained Gaussian channel. In particular, it follows that a deviation from normality for either player worsens the mutual information from that player's point of view, thus establishing what the optimal transmitter and jammer should be. Based on this single-letter game formulation, the following points can be made:

1. Mutual information is the appropriate cost function to be maximized/minimized by the transmitter/jammer of the watermark signal. In other words, the objective is to compute the capacity of a certain channel, and channel capacity is defined in terms of the above-noted mutual information expression.

2. Playing the above-described jamming game independently on each single-letter channel in the array 10 of FIG. 1 is optimal: any correlations existing among different $w_i^{(k)}$ or among different $j_i^{(k)}$ could be exploited by the other player in order to increase or decrease mutual information to his advantage.

3. From the saddlepoint conditions, it follows that $W^{(k)}$ should be $N(\vec{0}, I)$, and $J^{(k)}$ should be $N(\vec{0}, \sigma^2 I)$.

It should be noted that, in many applications, Gaussian distributions are used as an idealization of some unknown distribution, and deviations from the Gaussian assumption typically result in a degradation of the performance of an algorithm designed for the Gaussian case. A typical example is the approximation of a Minimum Mean-Square Error (MMSE) estimator by its linear version, i.e., in the Gaussian case the estimator and its approximated linear version coincide. However, in the case of digital image watermarking, assuming that the noise introduced by the jammer of the watermark signal is Gaussian is a worst-case, conservative assumption, i.e., deviations from Gaussian will only help improve watermark detection. This is because Gaussian noise is the most difficult type of noise to penetrate.

In accordance with the foregoing description, the capacity of the array 10 of FIG. 1 as a function of the noise variance $\sigma^2$ is given by:

$$C(\sigma) = \sum_{k=1}^{N} \sum_{i=1}^{n} \frac{1}{2}\log\left(1 + \frac{1}{\sigma^2}\right) = \frac{nN}{2}\log\left(1 + \frac{1}{\sigma^2}\right).$$

This capacity measure establishes an upper bound on the number of bits that can be stored in the array 10.

The invention also provides suitable encoding devices for storing bits in an image characterized as an array of storage devices as illustrated in FIG. 1. A problem associated with the design of such encoding devices is the following uncertainty: at the time the watermark is embedded in the image, there is generally no knowledge available regarding the type and amount of noise that will be introduced in an attack, but the storage capacity of the array is a function of the noise variance.

Suppose the goal is to reliably distinguish $M = 2^B$ different watermarks, which will require that B digital watermark information bits be stored in the array 10. Furthermore, assume that each of the N components of the array 10 has a fixed but unknown capacity which is a function of the noise variance. The above-noted uncertainty can be addressed by a conservative approach in which only one bit is stored in each of the N storage devices of the array 10, i.e., in each of N image components. A determination is then made as to how the probability of decoding error is affected as $\sigma^2$ changes.

This approach can be used to design watermarking systems in which the amount of noise that needs to be introduced to bring the probability of watermark decoding error to unacceptable levels is also sufficient to degrade the image to the point that it becomes completely worthless. Furthermore, since N>>B in many applications, a given design can be made even more robust to attack by mapping the B information bits to N channel bits using an (M, N) code, where $M=2^B$ is the number of distinct watermarks, and N is the block length of the code. Examples of such codes can be found in the above-cited T. Cover and J. Thomas reference. Other codes suitable for use with the invention include repetition codes, linear block codes and convolutional codes.

Figure 3:
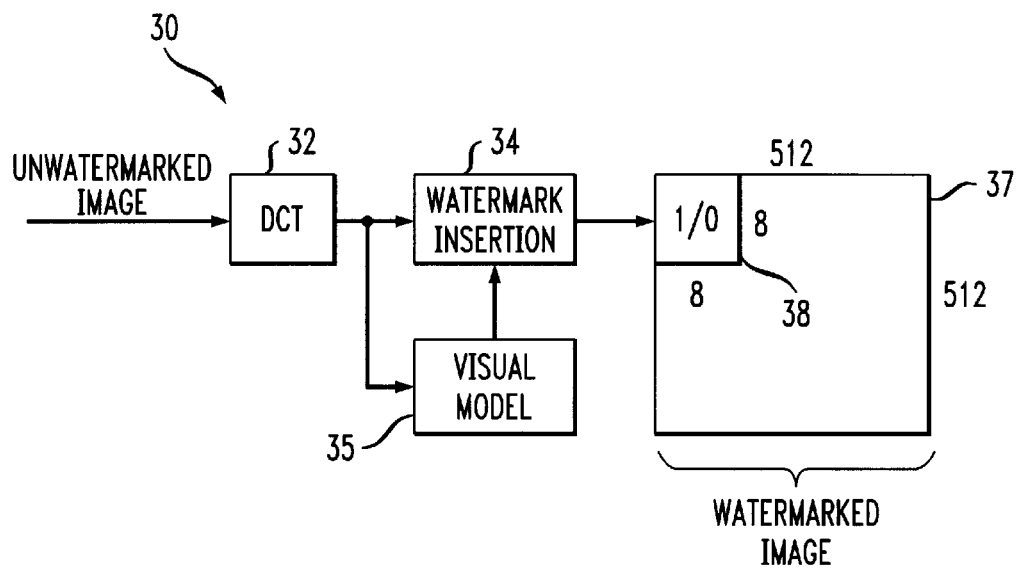
FIG. 3 is a block diagram showing an illustrative embodiment of an encoder in accordance with the invention.

FIG. 3 shows an encoder 30 configured in accordance with the invention, for implementing the above-described digital watermarking process. The encoder 30 includes a discrete cosine transform (DCT) element 32 for generating, e.g., 8×8 pixel DCT blocks from an original unwatermarked image. A watermark insertion element 34 stores a bit of digital watermark information in each of at least a subset of the 8×8 pixel DCT blocks of the image. For example, if the original input image is 512×512 pixels in size, a total of 4096 8×8 DCT blocks are generated. Each of the 8×8 DCT blocks represents a component of the image in which a bit of digital image watermarking information can be stored. The watermark insertion element 34 operates in accordance with information supplied from a visual model 35 to determine which of the 8×8 DCT blocks should be used to store the digital watermark information, e.g., which blocks are perceptually most important to the image such that modification or deletion of the watermark renders the image unusable. As previously noted, the digital watermark information in this example is inserted in the form of a single bit for each of the designated components. The visual model 35 may also be used to determine, e.g., the manner in which the modulation waveform is applied to a given one of the image components. For example, the visual model 35 may be used to provide an indication as to how "strongly" a modulation waveform should be applied to a given component.

As mentioned above, the digital watermark information bits may be mapped to channel bits for storage in each of the components of the image using an appropriate code. For example, B bits of digital watermark information can be mapped to N=4096 channel bits, such that a single channel bit is stored in each of the N=4096 components of the image.

The operation of the visual model 35 may be in accordance with well-known conventional techniques, such as those described in Andrew B. Watson, "DCT Quantization Matrices Visually Optimized for Individual Images," Human Vision, Visual Processing, and Digital Display IV, Bernice E. Rogawitz, Editor, Proc. SPIE 1913–14, 1993.

An example of a pair of suitable channel modulation waveforms for use in the encoder 30 for storing a single bit in a given image component is the pair of Gaussian vectors $s^{(k),b}=[s_1^{(k),b} \ldots s_n^{(k),b}]$, where $s^{(k),b} \sim N(0, I)$ and b=0, 1. In this case, a given bit b=0,1 of digital watermark information is stored in the given image component by modulating $W^{(k)}=s^{(k),b}$ onto that component in insertion element 34. The output of the encoding process is a watermarked image 37 which includes a plurality of image components, at least a subset of which each store a single bit of digital watermark information. For example, component 38 stores a single bit b=0,1 of the digital watermark of the watermarked image 37, in the form of a corresponding one of the Gaussian vectors $s^{(k),b}$.

In the above example, a particular modulation waveform represents a logic "1", while another modulation waveform represents a logic "0". In other embodiments, a single modulation waveform could be used, with a logic "1" being indicated by the presence of the waveform and a logic "0" being indicated by the absence of the waveform. As another example, a logic "1" could be indicated by a positive value of the single waveform, and a logic "0" by a negative value of the waveform. These and other types of modulation processes suitable for use with the present invention may be implemented in a straightforward manner using well-known conventional techniques, as will be apparent to those of ordinary skill in the art.

A more detailed example of the modulation of digital watermark information onto a given image component is as follows. Assume that there are N image components, each corresponding to an 8×8 block of pixels, and that k=1, 2, . . . N. Also assume that there are a total of B=N bits of digital watermark information to be inserted into the image, i.e., a single bit of digital image watermarking information is to be inserted in each 8×8 component. A given bit of digital image watermarking information is represented in this case by a waveform corresponding to a random vector of length n=8×8=64, i.e., the vector includes one element for each pixel of the 8×8 block. More specifically, logic "0" and "1" values are represented as follows:

$$0 = w^{(0)} = \{w_1^{(0)}, w_2^{(0)}, \ldots w_n^{(0)}\},$$

$$1 = w^{(1)} = \{w_1^{(1)}, w_2^{(1)}, \ldots w_n^{(1)}\},$$

Either a "0" bit or a "1" bit of digital watermark information is added to a given one of the N components of the image by applying the corresponding length-n random vector to the n elements of that component. Perceptual weights generated by the above-noted perceptual model may be used to determine how strong each element of the random vectors can be without significantly degrading image quality. The resulting element of a given one of the N watermarked image components is given by:

$$m_i^{(k)} = c_i^{(k)} + p_i^{(k)} w_i^{(j)},$$

where i=1, 2, . . . n, j=0, 1, and k=1, 2, . . . N. The given watermarked component is given by:

$$M^{(k)} = C^{(k)} + P^{(k)} W^{(j)},$$

where for each k, either a 0 or a 1 is assigned to j. It should again be emphasized that the above is only an example of the waveform modulation process of the invention. As previously noted, alternative embodiments could utilize other modulation techniques.

Figure 4:
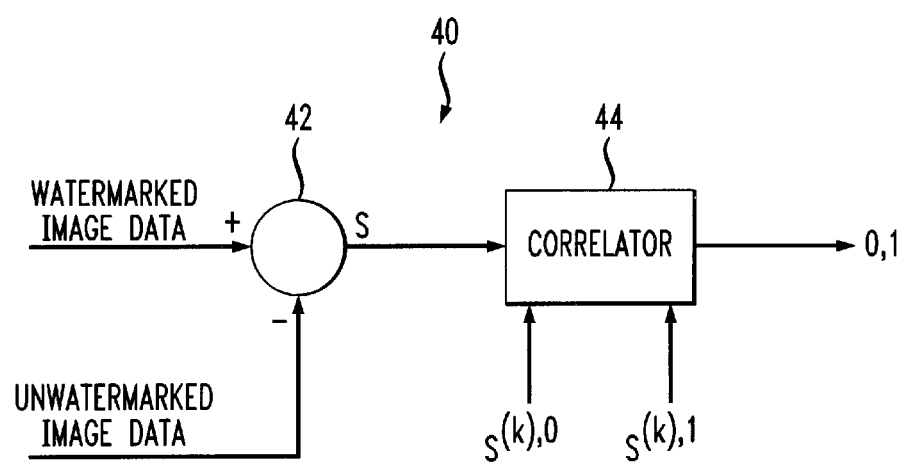
FIG. 4 is a block diagram showing an illustrative embodiment of a decoder in accordance with the invention.

FIG. 4 shows a block diagram of a coherent detector 40 for detecting a digital image watermark of the type inserted by the encoder 30 of FIG. 3. A given channel bit of the inserted watermark is detected by correlating an n-bit extracted sequence s against both $s^{(k),0}$ and $s^{(k),1}$ in a correlator 44. The extracted sequence may be generated by subtracting the known unwatermarked image data for that sequence from the corresponding watermarked image data in element 42. Alternatively, the element 42 may be eliminated and the watermarked image data applied directly to the correlator 44. The correlator 44 makes a decision as to the value of the corresponding bit of the digital watermark based on which correlation is highest. This arrangement corresponds generally to the optimal coherent detector for a known signal observed in independent, identically-distributed (i.i.d.) Gaussian noise, as described in, e.g., H. V. Poor, "An Introduction to Signal Detection and Estimation," Springer-Verlag, 1994.

The above-described digital image watermarking process is robust to attack because the potential jammer does not possess exact knowledge of the specific channel modulation waveforms used. Although for a random choice of waveforms there is a non-zero probability that both will lie close to each other, resulting in a device with high probability of bit error, this is unlikely to happen. By a straightforward application of the well-known Strong Law of Large Numbers (SLLN), one can show that, for large n, $\|s^0-s^1\|^2 \approx \sqrt{2n}$. Hence, if n is large enough, one can conclude that with high probability the distance separating the modulation waveforms will be large.

Numerical simulations have been performed to illustrate the performance advantages of the above-described digital image watermarking techniques. The simulations were performed using a well-known standard test image referred to as "Lena." The 512×512 pixel test image was separated into a total of 4096 8×8 pixel discrete cosine transform (DCT) blocks. The number of digital watermark information bits B to be stored in the test image was selected as 32. If B=32 bits can be stored in the image reliably, then $2^{32} \approx 4 \cdot 10^9$ distinct watermarks can be distinguished reliably, a number useful for many practical applications. These 32 digital watermark information bits were mapped to 4096 channel bits using a simple (128,1,128) replication code.

Figure 5:
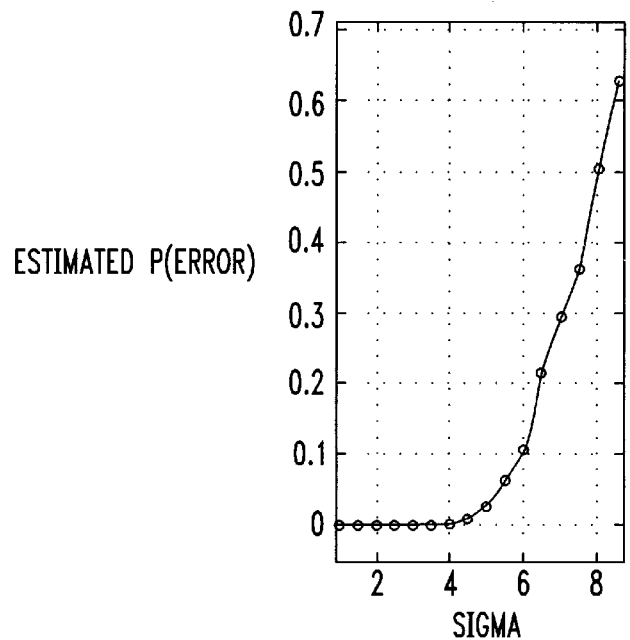
FIGS. 5 and 6 are plots showing performance data based on a numerical simulation of a digital image watermarking technique in accordance with the invention.

In order to measure the robustness of the digital watermarking techniques, the probability of watermark decoding error was estimated for different noise variances. The estimates were made by first taking a random sequence of 32 bits, storing them in the image, adding noise to the image, and retrieving the stored bits. This process was then repeated 1000 times, and the probability of error estimated as the ratio of the number of incorrectly decoded watermarks to 1000. Also, in order to measure how image quality degrades as a function of jammer noise, the peak signal-to-noise ratio (PSNR) of the noisy image is computed against the clean original, for a number of different noise variance values. The PSNR for images assumes a peak pixel intensity value of 255. FIG. 5 shows the resulting plot of the estimated probability of error, and FIG. 6 shows the resulting plot of the PSNR, both as a function of σ.

Figure 6:
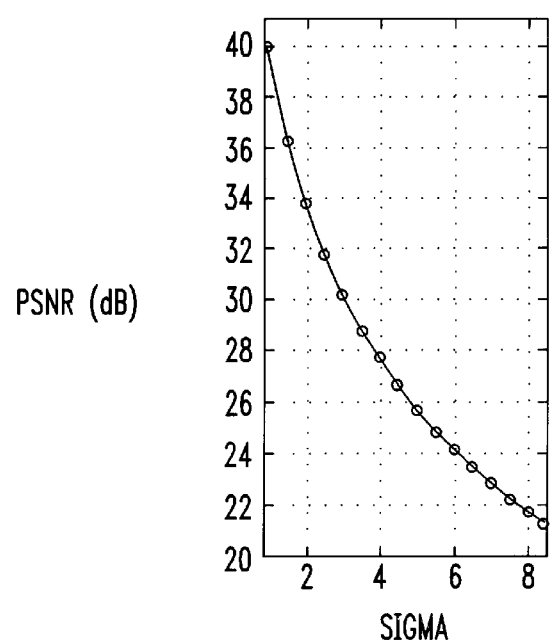

It can be seen from the plots of FIGS. 5 and 6 that for values of σ up to about 3.5, the number of incorrectly retrieved watermarks over 1000 tests is zero, and that for a value of σ=3.5, a typical corrupted image achieves a PSNR value of only about 28.8 dB. Moreover, using the capacity formula given previously, with σ=3.5, C(σ)=9970 bits, which is significantly more than the 32 bits stored in the example.

A more complex modulation process could be used in order to increase the number of distinct watermarks that can be generated. For example, higher rate codes could be used to increase the number of bits that can be reliably stored in the array, at the expense of added computational complexity.

It should be noted that the above-described additive noise model may not provide suitable approximations for certain types of distortions. For example, the additive noise model is generally not a good model for geometric distortions.

It should also be noted that a frame-by-frame application of the above-described techniques to video generally yields poor performance. However, the techniques of the invention can be used in conjunction with other types of storage array models in order to improve performance for video or other types of electronic data.

The above-described embodiments of the invention are intended to be illustrative only. For example, although illustrated using coherent detection, the invention can also be implemented using other types of detection arrangements, including non-coherent detection. Moreover, the particular encoding and decoding architectures shown are examples only, and other types of encoding and decoding devices may be used to implement the watermarking techniques of the invention. These and numerous other embodiments within the scope of the following claims will be apparent to those skilled in the art.

What is claimed is:

1. A method for inserting digital watermark information into an image, the method comprising the steps of:

separating the image into a plurality of components; and
associating one or more bits of the digital watermark information with each of at least a subset of the plurality of components of the image, by modulating each of the components in the at least a subset of the plurality of components with a corresponding modulation waveform representative of at least a portion of the one or more bits.

2. The method of claim 1 wherein the separating step includes separating the image into a plurality of discrete cosine transform (DCT) blocks of a predetermined dimension.

3. The method of claim 1 wherein the separating step includes separating the image into a plurality of image subband components.

4. The method of claim 1 wherein the digital watermark information includes a total of B bits of information for representing a particular watermark, such that $M=2^B$ distinct watermarks can be generated using the B information bits.

5. The method of claim 4 further including the step of mapping the B information bits to N channel bits using an (M, N) code, where $M=2^B$ is the number of distinct watermarks, and N corresponds to the block length of the code and the number of image components generated in the separating step, and wherein the associating step includes associating a given one of the N channel bits with a corresponding one of the N image components.

6. The method of claim 1 wherein the modulation waveform comprises a selected one of a set of orthogonal modulation waveforms.

7. The method of claim 1 wherein the modulation waveform comprises a selected one of a pair of vectors $s^{(k),b}=[s^{(k),b} \ldots s^{(k),b}]$ having a zero mean and an identity covariance matrix.

8. The method of claim 7 wherein b has a value of logic zero or logic one, such that $s^{(k),0}$ is representative of a bit of digital image watermark information having a value of logic zero, and $s^{(k),1}$ is representative of a bit of digital image watermark information having a value of logic one.

9. The method of claim 1 further including the step of applying a visual model to determine at least one of: (i) which of the plurality of image components are to be associated with one or more bits of the digital watermark information, and (ii) the manner in which the modulation waveform is applied to a given one of the image components.

10. The method of claim 1 wherein an upper bound on the total number of bits in the digital watermark information is given by:

$$\frac{nN}{2}\log\left(1+\frac{1}{\sigma^2}\right),$$

where N corresponds to the number of image components generated in the separating step, n is the number of bits of the digital image watermark information associated with each of the N components, and $\sigma^2$ is a measure of noise variance associated with a potential jammer of the information.

11. An apparatus for inserting digital watermark information into an image, the apparatus comprising:

an encoder operative to associate one or more bits of digital watermark information with each of at least a subset of a plurality of components of the image, by modulating each of the components in the at least a subset of the plurality of components with a corresponding modulation waveform representative of at least a portion of the one or more bits.

12. The apparatus of claim 11 wherein the encoder is further operative to separate the image into a plurality of discrete cosine transform (DCT) blocks of a predetermined dimension.

13. The apparatus of claim 11 wherein the encoder is further operative to separate the image into a plurality of image subband components.

14. The apparatus of claim 11 wherein the digital watermark information includes a total of B bits of information for representing a particular watermark, such that $M=2^B$ distinct watermarks can be generated using the B information bits.

15. The apparatus of claim 14 wherein the encoder is further operative to map the B information bits to N channel bits using an (M, N) code, where $M=2^B$ is the number of distinct watermarks, and N corresponds to the block length of the code and the number of image components generated by the encoder, and wherein the encoder associates a given one of the N channel bits with a corresponding one of the N image components.

16. The apparatus of claim 11 wherein the modulation waveform comprises a selected one of a set of orthogonal modulation waveforms.

17. The apparatus of claim 11 wherein the modulation waveform comprises a selected one of a pair of vectors $s^{(k),b}=[s_1^{(k),b} \ldots s_n^{(k),b}]$ having a zero mean and an identity covariance matrix.

18. The apparatus of claim 17 wherein b has a value of logic zero or logic one, such that $s^{(k),0}$ is representative of a bit of digital image watermark information having a value of logic zero, and $s^{(k),1}$ is representative of a bit of digital image watermark information having a value of logic one.

19. The apparatus of claim 11 wherein the encoder is further operative to apply a visual model to determine at least one of: (i) which of the plurality of image components are to be associated with one or more bits of the digital watermark information, and (ii) the manner in which the modulation waveform is applied to a given one of the image components.

20. The apparatus of claim 11 wherein an upper bound on the total number of bits in the digital watermark information is given by:

$$\frac{nN}{2}\log\left(1+\frac{1}{\sigma^2}\right),$$

where N corresponds to the number of image components, n is the number of bits of the digital image watermark information associated with each of the N components, and $\sigma^2$ is a measure of noise variance associated with a potential jammer of the information.

21. An article of manufacture comprising a machine-readable storage medium containing one or more software programs which when executed implement the steps of:

separating the image into a plurality of components; and associating one or more bits of the digital watermark information with each of at least a subset of the plurality of components of the image, by modulating each of the components in the at least a subset of the plurality of components with a corresponding modulation waveform representative of at least a portion of the one or more bits.

22. An apparatus for detecting digital watermark information inserted into an image, the apparatus comprising:

a decoder operative to generate an estimate of one or more bits of digital watermark information for each of at least a subset of a plurality of components of the image, wherein each of the components in the at least a subset of the plurality of components are modulated with a corresponding modulation waveform representative of at least a portion of the one or more bits.

* * * * *